United States Patent [19]

Jones et al.

[11] Patent Number: 4,756,784
[45] Date of Patent: Jul. 12, 1988

[54] METHOD OF MAKING PIPE-JOINT GASKET

[75] Inventors: Lawrence S. Jones, Hueytown; George F. Rhodes, Leeds, both of Ala.; Gene F. Fornaro, Raleigh, N.C.

[73] Assignee: United States Pipe and Foundry Company, Birmingham, Ala.

[21] Appl. No.: 869,493

[22] Filed: Jun. 2, 1986

[51] Int. Cl.⁴ .................. B29C 65/02; B32B 31/30; B65H 69/06
[52] U.S. Cl. .................................. 156/157; 156/218; 156/242; 156/244.11; 156/244.24; 156/245; 156/304.1; 156/304.5; 264/148; 264/171; 264/177.1; 264/177.16; 264/262; 264/263; 264/138

[58] Field of Search ................. 156/244.11, 244.18, 156/244.24, 242, 245, 304.1, 304.2, 304.5, 304.6, 157-159, 217-218; 264/262-263, 268, 177.1, 177.16, 171, 148, 248, 138; 425/DIG. 42; 285/110, 245, 279; 277/227-228

[56] References Cited

U.S. PATENT DOCUMENTS

| 2,953,398 | 9/1960 | Haugen et al. | 285/110 |
| 3,400,030 | 9/1969 | Burger | 156/304.2 |
| 3,493,645 | 2/1970 | Sanderson | 277/228 |
| 3,535,824 | 10/1970 | Kessler | 156/244.24 |
| 3,871,937 | 3/1975 | Hollingsead | 156/244.18 |
| 4,108,481 | 8/1978 | Graham | 285/231 |

Primary Examiner—Merrell C. Cashion, Jr.
Attorney, Agent, or Firm—James W. Grace; Charles W. Vanecek

[57] ABSTRACT

This invention pertains to a method of making a pipe gasket having an asymmetric profile which is made by connecting two ends of an extruded elastomeric material, and the gasket made thereby.

8 Claims, 1 Drawing Sheet

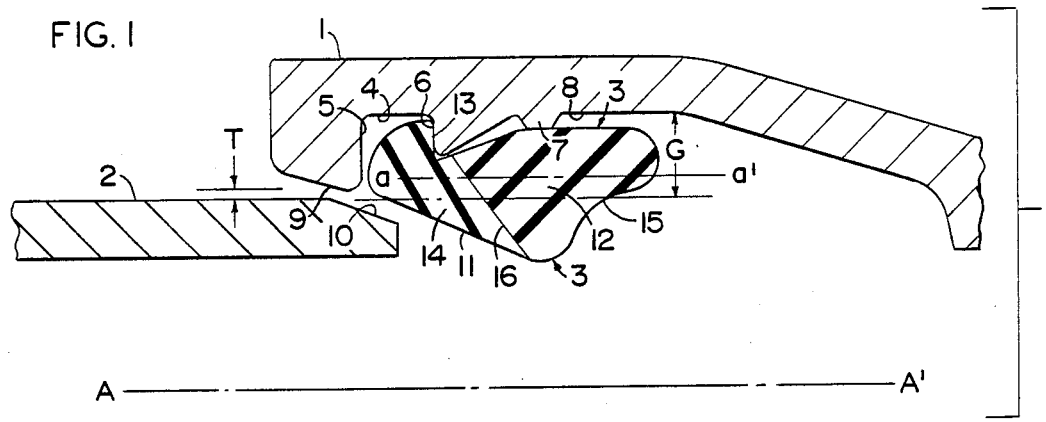
FIG. 1
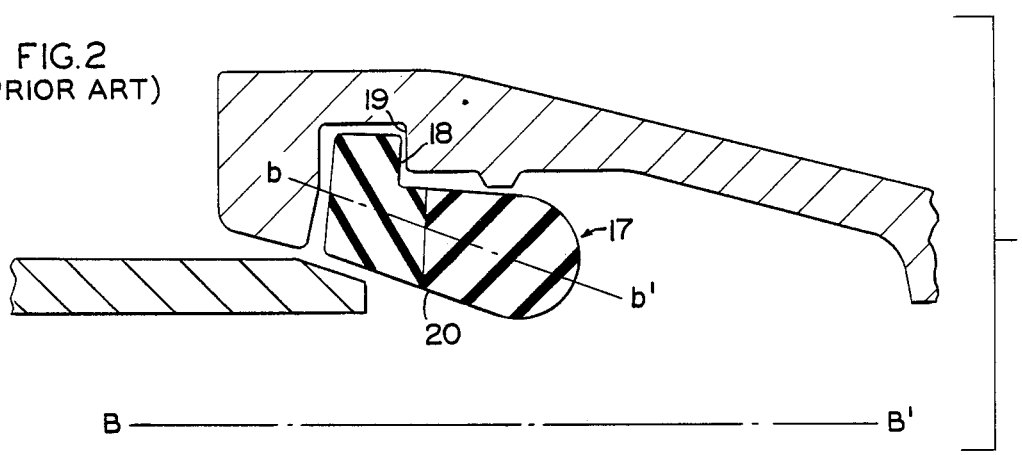
FIG. 2
(PRIOR ART)
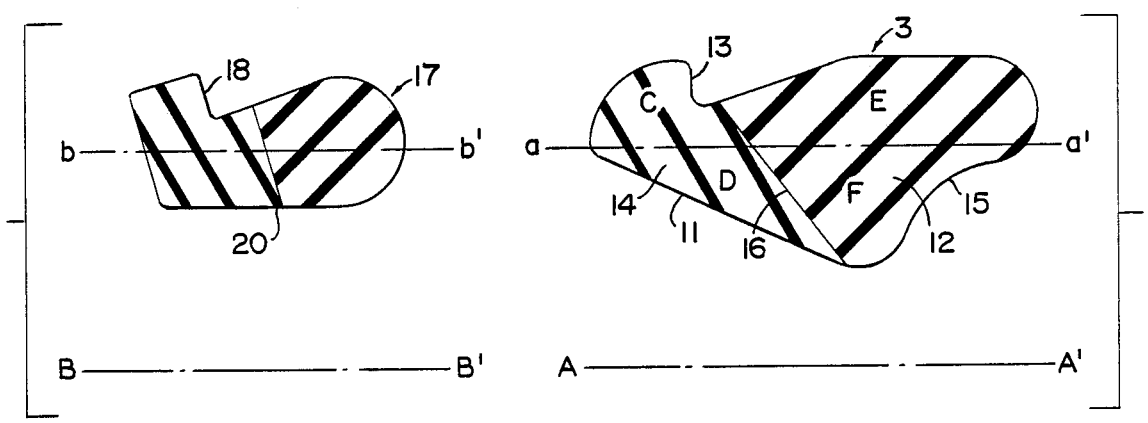
FIG. 3
(PRIOR ART)
FIG. 4

METHOD OF MAKING PIPE-JOINT GASKET

BACKGROUND OF THE INVENTION

1. Field of the Invention

This invention pertains to a pipe gasket having an asymmetric profile which is made by connecting two ends of an extruded elastomeric material.

The gasket of the invention is used in joining pressure pipe and, more particularly, those pipe with a bell on one end and the other end plain.

2. Description of the Prior Art.

Extruding, cutting and splicing rubber strips of a single hardness and symmetric cross section is well known and many o-rings are made by this process. Such o-rings have round, square, rectangular or other symmetric cross-sectional shapes. Extruding, cutting and splicing of rubber strips of asymmetric cross sections which are made for push-on joint pipe gaskets is not known.

Cast iron pressure pipe with a bell on one end and the other plain or bevelled, have, for many years, been joined by utilizing a rubber gasket which is compressed between the inside walls of the bell and the outside wall of the plain or bevelled end of the next pipe in a series of telescoped pipes. The most successful of such systems provides an elongated retainer groove in the bell with a gasket sealing wall as well as throat and wall portions which guide and limit travel of the plain end as it passes through the bell opening and the rubber gasket. Such a pipe joint is described in U.S. Pat. No. 2,953,398 issued Sept. 20, 1960 and U.S. Pat. No. 4,108,481 issued Aug. 22, 1982. Gaskets of this type generally have three essential features, a sealing bulb portion, a heel portion and an inner conical wall.

Since both the pipe bell and plain end may be produced without machining, relatively large variations in as-cast diameters are encountered. The gasket sealing bulb, in turn, is subjected to a wide range of compressions from approximately 2% to 45% of its original thickness. To aid in entry of the plain end into the gasketed bell over the large range of diameters encountered, the inner wall of the gasket is generally made in a conical form which tapers from the mating throat diameter of the bell to the inner sealing bulb diameter of the gasket. To further aid in the assembly, the gasket bulb has a relatively soft Shore A durometer hardness between about 40 and 60.

The retainer heel portion of the gasket is typically produced from a higher hardness compound than the sealing bulb to aid in retention of the gasket during joint assembly and to prevent blowout of the softer bulb portion when the assembled joint is subjected to high internal pressures. The retainer heel portion of a typical gasket has a Shore A durometer hardness between about 75 to 90. The retainer heel portion is generally designed to fit into a retaining groove of the bell section of the enclosing pipe. Known gaskets exhibiting these features are asymmetric in cross-sectional profile.

Gaskets of similar asymmetric cross-sectional profiles have also been produced from single hardness rubber compounds. If the entire gasket is of the harder compound, extremely high assembly forces are required. If the entire gasket is of the softer compound, the gasket is subject to be dislodged during assembly and, in addition, only relatively low internal pressures can be held. Single hardness gaskets are, therefore, normally produced of an intermediate Shore A hardness range from between about 60 and 75. In general, with single hardness gaskets of this type, one or more of the attributes of the dual hardness gasket is diminished.

It has been conventional to manufacture asymmetric profile annular pipe gaskets by the compression molding process. For dual hardness gaskets, a portion of the mold (corresponding to the retainer heel portion of the gasket) is filled with a rubber compound which, when cured, will have a Shore A durometer hardness of between about 75 and 90 and a second portion of the mold (corresponding to the sealing bulb portion of the gasket) is filled with a rubber compound which, when cured, will have a Shore A durometer hardness of between about 40 and 60. The mold is closed and, with suitable pressure and temperature, the two compounds are bonded together and the gasket is cured.

It is also conventional to manufacture asymmetric profile dual hardness gaskets by extruding the uncured compounds together to form a "preprep stock" of the desired profile cross-sectional area. The uncured preprep stock is then placed in a rubber mold for forming, joining and curing. Asymmetric profile dual hardness and single hardness gaskets are made by these and other well-known molding techniques.

SUMMARY OF THE INVENTION

The present invention relates to a method of making an asymmetric profile pipe gasket. The gasket is made by extruding a rubber compound in the shape of the cross section in a long extrusion, curing the extrusion, cutting the elongated extrusion a predetermined length and bonding the two free ends together to form an annular gasket.

Because the newly formed annular gasket has an asymmetric shape, unless special precautions are taken, the annular gasket will distort when rolled and bonded into a ring. This distortion makes the gasket unserviceable since the gasket would not properly sit in the pipe bell gasket retainer portion. This distortion will be more pronounced in those gaskets made with rubber material with two different hardnesses.

OBJECTS OF THE INVENTION

It is an object of the present invention to provide a method of making single or multiple hardness gaskets of asymmetric cross section comprising the steps of extruding through a die an extrusion made of rubber or similar elastomeric material, curing the strips, cutting the elongated strips a predetermined length and bonding the two free ends together to form an annular pipe gasket.

It is another object of the invention to provide a novel gasket of asymmetric cross section of single or multiple hardnesses which will not distort from the designed profile when an extruded length of the profile is rolled and bonded into a ring.

It is a further object of the present invention to provide a novel annular pipe gasket of asymmetric cross section having single or multiple hardnesses which is less expensive to produce than previously known gaskets.

BRIEF DESCRIPTION OF THE DRAWING

Other objects and advantages of the present invention will become apparent to those skilled in the art from the following detailed description of the invention taken in conjunction with the accompanying drawing in which like numerals indicate like elements and in which:

FIG. 1 is a cross-sectional view of a pipe bell using the gasket of the present invention and of a plain end of another pipe entering the pipe bell.

FIG. 2 is a cross-sectional view of a prior art pipe bell and gasket with a plain end of another pipe entering the pipe bell, FIG. 3 is a cross-sectional view of a prior art gasket illustrating the distortion which occurs when the prior art gasket profile is extruded and spliced into a gasket, FIG. 4 is a cross-sectional view of the gasket of the present invention showing the minor axis of flexure and the four quandrants of the gasket.

DESCRIPTION OF THE PREFERRED EMBODIMENT

In the preferred embodiment illustrated in FIG. 1 there is shown a joint which is to be formed between a pipe bell 1 of one pipe and a plain end 2 of another pipe. The gasket 3 of the present invention is shown in place in pipe bell 1.

The inner surface of pipe bell 1 has a retainer groove 4 bounded by a front wall 5 and retainer wall 6, and a compression rib 7 which extends radially inwardly from a sealing wall 8. In addition, the bell has a throat portion 9 which extends radially inwardly and joins the front wall 5. As the joint is assembled the throat 9 guides the plain end 2 until the bevelled end 10 contacts the conical inner face 11 of the gasket 3. The wedging action between the bevelled end 10 and the conical face 11 compresses the sealing bulb portion 12 of the gasket between the plain end 2 and the compression rib 7 and the sealing wall 8. The retainer wall 6 of the bell inner surface engages the retainer shoulder 13 of the gasket to prevent the gasket from dislodging during assembly of the joint.

In tight joint conditions, the gasket space G between the sealing wall 8 and plain end 2 is relatively small and the gasket compression and joint assembly forces are relatively high. A sealing bulb 12 of a relatively soft durometer elastomer is used to reduce the force required for tight joint assemblies. A harder durometer elastomer is used for the retainer heel portion 14 to prevent the gasket from dislodging during tight joint assemblies.

In loose joint conditions the throat gap T between the throat 9 and the plain end 2 is relatively large. When the pipe joint is pressurized, the gasket is forced toward the front wall 5 and fills the retainer groove 4 of the pipe bell. The softer sealing bulb 12 of the gasket will attempt to extrude through the throat gap T. The harder retainer heel portion 14 of the gasket, resists the extrusion of the softer bulb portion 12 of the gasket through the throat gap T.

While the invention has been described in the environment of a pipe joint in which the bell end of the enclosing pipe has a compression rib 7, the gasket will also perform its sealing function with a bell configuration such as that shown in U.S. Pat. No. 2,953,398 which does not have a compression rib.

The preferred embodiment gasket is made by forming an extrusion formed of two rubber compounds of different hardness. Each particular compound being extruded may be of an asymmetric cross section. Preferably, the two compounds are extruded through separate dies and immediately thereafter through a common die and subsequently cured in a manner well known to those skilled in the art of dual hardness rubber extrusion.

The cured dual hardness extrusion is then cut to a predetermined length having free ends. The two free ends are brought together and then spliced or adhered together to form a circular gasket. When an extrusion is bent to form a gasket, the profile of the extrusion has a natural tendency to bend about the weak or minor axis of flexure of the profile such that the minor axis of flexure forms a cylinder of revolution about the central axis of the gasket. In a homogeneous material in which the modulus of elasticity is the same in compression and in tension, the minor axis of flexure coincides with the minor axis of the moment of inertia of the profile. In rubber compounds, there can be considerable difference between the tensile modulus and the compressive modulus. This difference causes the minor axis of flexure to shift away from the minor axis of the moment of inertia. With symmetric profiles of rubber extrusions which have an axis of symmetry which coincides with the major axis of the moment of inertia (perpendicular to the minor axis), the axis of flexure is parallel to the minor axis of the moment of inertia. A parallel shift in the axes causes no distortion since both the axes form cylinders of rotation around the central axis of the gasket. Extrusions of symmetric profiles can, therefore, be readily formed into a ring without appreciable distortion of the profile.

It is well known that extruded straight strips of an elastomer can be cut a desired length and spliced to form an annular gasket. The known pipe gaskets made in this manner have a symmetrical cross-sectional profile with at least one axis of symmetry. Gaskets of this type are used for pipe which have diameters which vary over a relatively small range such as are encountered in machined joints.

It has been found that prior art asymmetric profile gaskets normally used for push-on joint pipe will distort from the intended profile when made by the extrusion process. The minor axis of flexure b-b' of the designed profile of a prior art gasket 17 of FIG. 2 is not parallel to the axis of rotation B-B'. As shown in FIG. 3 the prior art gasket 17 designed profile, if extruded and spliced into a ring, distorts from its intended shape so that the minor axis of flexure b-b' is cylindrical. In the distorted shape, the retainer shoulder 18 would form an angle to the bell retainer wall 19 and does not function to retain the gasket during assembly. In addition, the conical inner face 20 of gasket 17 distorts to be more cylindrical in shape. The distortions prevent gasket 17 from properly sitting in the pipe bell and functioning as a push-on joint pipe gasket over the required pipe tolerance ranges. Similar distortions occur with other known single and dual hardness asymmetric gasket profiles used for push-on joint pipe when the gaskets are made by the extrusion process.

It has been found that asymmetric profiles exhibiting the features required for push-on pipe gaskets can be designed such that the profiles will not distort when a single hardness rubber extrusions of the profiles are formed into an annular gasket. In addition, it has been found that asymmetric profiles exhibiting the features required for push-on pipe gaskets can be designed such that the profiles will not distort when multiple hardness extrusions of the profiles are formed into an annular gasket.

The minor axis of flexure a-a' of gasket 3 of FIG. 4 of the present invention is predetermined and calculated by first calculating the orientation of the minor axis of the moment of inertia of a proposed cross section. The proposed profile is divided into four basic quandrants C, D, E and F as shown in FIG. 4. Quandrants C and D form the harder retainer heel portion of the gasket while quandrants E and F form the softer sealing bulb portion of the gasket. Quadrants C and E are above the minor axis of the moment of inertia and are in a state of tensile stress when the extruded profile is formed into a ring gasket. Quadrants D and F are below the axis and are in a state of compressive stress when the extruded profile is formed into a ring gasket.

The orientation of the minor axis of flexure of the proposed cross section is obtained by transforming the cross section of different moduli into an equivalent cross section of a single modulus. This transformation is accomplished by making proportional mathematical increases in the area of each quadrant to the modulus of the quadrant. For example, if the moduli of quadrants C, D, E, and F are 1000, 2000, 3000 and 4000 psi respectively, the area of quadrant D is doubled, the area of quadrant E is tripled, the area of quadrant F is quadrupled and no change is made to the area of quadrant C. Tensile moduli are used for the quadrants above the minor axis and compressive moduli are used for the quadrants below the axis. A new minor axis of moment of inertia is then calculated for the transformed cross section. As a result, the minor axis of flexure divides the profile in such a manner that the tensile moduli on one side of said minor axis equals the compressive moduli on the other side of said minor axis. This minor axis is now a close approximation of the axis of flexure of the cross section if the moduli are linear over stress range encountered. In fact, the moduli of elastomers are normally not linear, but, over the relatively small stress levels required to bend the strip to form a gasket, a linear approximation adequately predicts the axis of flexure.

The desired orientation of the axis of flexure is obtained by making changes to the gasket contour 15 in nonessential sections of the profile and/or to the hard-/soft parting line 16 and recalculating the orientation of the axis of flexure until the desired axis parallel to the central axis of the gasket is obtained. Nonessential sections of the profile are sections which do not breach the design of the conical inner face 11, the retainer shoulder 13 or the thickness of the sealing bulb.

The design process is aided by the use of computer graphics wherein the proposed gasket profile and hard-/soft parting line is input to a graphics computer by digitizing the profile on a digitizing table. Computer software was developed to divide the profile into any desired finite number of small squares or rectangles. The moments of inertia are calculated for each square or rectangle using well-known moment of inertia equations. The moment of inertia and the orientation of the major and minor axes of the moment of inertia is then determined for the total shape using well-known equations. The proposed gasket profile with orientation of the axes is shown on the computer terminal. Changes are made to the gasket profile either on the computer screen or through the digitizing tablet and the resultant effects on the axis orientation are readily seen. Revisions are made to the profile until the required parallel minor axis is achieved. A similar technique can be used with single hardness gaskets or for gaskets with more than two hardnesses.

While the body of the specification primarily relates to the embodiment involving the extrusion of the gasket, the invention comtemplates the production of the same gasket via the use of a compression mold having the determined profile.

The present embodiments of this invention are to be considered in all respects as illustrative and not restrictive, the scope of the invention being indicated by the appended claims.

We claim:

1. A method of making a pipe-joint gasket in the form of a circular strip of elastomeric material comprising the steps of
   (1) determining a profile for an asymmetric elastomeric gasket in which said profile has a minor axis of flexure parallel to the central axis of said gasket and in which said minor axis of flexure divides said profile in such manner that the tensile moduli on one side of said minor axis of flexure equals the compressive moduli on the other side of said minor axis of flexure,
   (2) preparing a die having said determined profile,
   (3) extruding through said die a quantity of an elastomeric material to produce a strip having said determined profile, said strip further having said minor axis of flexure located such that the tensile moduli on one side of said minor axis of flexure equals the compressive moduli on the other side of said minor axis of flexure,
   (4) curing said strip,
   (5) cutting said strip to a predetermined length having two free ends, and
   (6) making a circular gasket by forming a circular ring around a central axis of rotation and adhering said free ends together to form a closed gasket, whereby said minor axis of flexure becomes a cylinder parallel to the central axis of rotation.

2. The method of making a pipe-joint gasket in the form of a circular strip of elastomeric material comprising the steps of
   (1) determining a profile for an asymmetric elastomeric gasket in which said profile has a minor axis of flexure parallel to the central axis of said gasket and in which said minor axis of flexure divides said profile in such manner that the tensile moduli on one side of said minor axis of flexure equals the compressive moduli on the other side of said minor axis of flexure,
   (2) preparing a first die having said determined profile,
   (3) extruding through a second die a quantity of an elastomeric material to form a first strip of predetermined hardness, and having a shape conforming to a portion of said profile,
   (4) extruding through a third die a quantity of an elastomeric material to form a second strip of an elastomeric material having a hardness different from that of said first strip, and having a shape conforming to a different portion of said profile,
   (5) extruding said first and second strips in longitudinal abutting relation through said first die to form a unitary strip having multiple hardnesses along the length of said unitary strip, said unitary strip having said determined profile and having said minor axis of flexure located such that the tensile moduli on one side of said minor axis of flexure equals the compressive moduli on the other side of said minor axis of flexure, (6) curing said unitary strip, (7) cutting said unitary strip to a predetermined length having two free ends, and (8) making a circular gasket by forming a circular ring around a central axis of rotation and adhering said free ends together to form a closed gasket, whereby said minor axis of flexure becomes a cylinder parallel to the central axis of rotation.

3. The method of making a pipe-joint gasket in the form of a circular strip comprising the steps of (1) determining a profile for an asymmetric elastomeric gasket in which said profile has a minor axis of flexure parallel to the central axis of said gasket and in which said minor axis of flexure divides said profile in such a manner that the tensile moduli on one side of said minor axis of flexure equals the compressive moduli on the other side of said minor axis of flexure, (2) preparing a compression mold having said determined profile, (3) placing an elastomeric material into said compression mold, (4) curing said material into a strip having said determined profile and having said minor axis of flexure located such that the tensile moduli on one side of said minor axis of flexure equals the compressive moduli on the other side of said minor axis of flexure, and (5) making a circular gasket by forming a circular ring around a central axis of rotation and adhering the free ends of said strip together to form a closed gasket, whereby said minor axis of flexure becomes a cylinder parallel to the central axis of rotation.

4. The method of making a pipe joint gasket in the form of a circular strip comprising the steps of (1) determining a profile for an asymmetric elastomeric gasket in which said profile has a minor axis of flexure parallel to the central axis of said gasket and in which said minor axis of flexure divides said profile in such a manner that the tensile moduli on one side of said minor axis of flexure equals the compressive moduli on the other side of said minor axis of flexure, (2) preparing a compression mold having said determined profile, (3) placing first and second strips of elastomeric material of different hardnesses into longitudinal abutment in said compression mold, (4) forming a unitary strip in said compression mold, said unitary strip having said determined profile and having said minor axis of flexure located such that the tensile moduli on one side of said minor axis of flexure equals the compressive moduli on the other side of said minor axis of flexure, (5) curing said unitary strip, and (6) making a circular gasket by forming a circular ring around a central axis of rotation and adhering the free ends of said unitary strip together to form a closed gasket, whereby said minor axis of flexure becomes a cylinder parallel to the central axis of rotation.

5. A method of making a strip adapted to be made into a gasket in the form of a closed loop of elastomeric material comprising the steps of (1) determining a profile for an asymmetric strip in which said profile has a minor axis of flexure of said strip and in which said minor axis of flexure divides said profile in such a manner that the tensile moduli on one side of said minor axis of flexure equals the compressive moduli on the other side of said minor axis of flexure, (2) preparing a die having said determined profile, (3) extruding through said die a quantity of an elastomeric material to produce a strip having said determined profile, said strip having said minor axis of flexure located such that the tensile moduli on one side of said minor axis of flexure equals the compressive moduli on the other side of said minor axis of flexure, (4) curing said strip, and (5) cutting said strip to a predetermined length having two free ends, whereby said strip is adapted to be made into a gasket in the form of a closed loop.

6. The method of making a strip adapted to be made into a gasket in the form of a closed loop of elastomeric material comprising the steps of (1) determining a profile for an asymmetric strip in which said profile has a minor axis of flexure of said strip and in which said minor axis of flexure divides said profile in such a manner that the tensile moduli on one side of said minor axis of flexure equals the compressive moduli on the other side of said minor axis of flexure, (2) preparing a first die having said determined profile, (3) extruding through a second die a quantity of an elastomeric material to form a first strip of predetermined hardness, and having a shape conforming to a portion of said profile, (4) extruding through a third die a quantity of an elastomeric material to form a second strip of an elastomeric material having a hardness different from that of said first strip, and having a shape conforming to a different portion of said profile, (5) extruding said first and second strips in longitudinal abutting relation through said first die to form a unitary strip having a multiple hardnesses along the length of said unitary strip, said unitary strip having said determined profile and having said minor axis of flexure located such that the tensile moduli on one side of said minor axis of flexure equals the compressive moduli on the other side of said minor axis of flexure, (6) curing said unitary strip, and (7) cutting said unitary strip to a predetermined length having two free ends, whereby said strip is adapted to be made into a gasket in the form of a closed loop.

7. The method of making a strip adapted to be made into a gasket in the form of a closed loop comprising the steps of (1) determining a profile for an asymmetric strip in which said profile has a minor axis of flexure of said strip and in which said minor axis of flexure divides said profile in such a manner that the tensile moduli on one side of said minor axis of flexure equals the compressive moduli on the other side of said minor axis of flexure, (2) preparing a compression mold having said determined profile, (3) placing an elastomeric material into said compression mold, (4) curing said material into a strip having said determined profile and having said minor axis of flexure located such that the tensile moduli on one side of said minor axis of flexure equals the compressive moduli on the other side of said minor axis of flexure, (5) curing said unitary strip, and (6) cutting said strip to a predetermined length having two ends whereby said strip is adapted to be made into a gasket in the form of a closed loop.

8. The method of making a strip adapted to be made into a gasket in the form of a closed loop comprising the steps of (1) determining a profile for an asymmetric strip in which said profile has a minor axis of flexure of said strip and in which said minor axis of flexure divides said profile in such a manner that the tensile moduli on one side of said minor axis of flexure equals the compressive moduli on the other side of said minor axis of flexure, (2) preparing a compression mold having said determined profile, (3) placing first and second strips of elastomeric material of different hardnesses into longitudinal abutment in said compression mold, (4) forming a unitary strip in said compression mold, said unitary strip having said determined profile and having said minor axis of flexure located such that the tensile moduli on one side of said minor axis of flexure equals the compressive moduli on the other side of said minor axis of flexure, (5) curing said unitary strip, and (6) cutting said unitary strip to a predetermined length having two ends, whereby said strip is adapted to be made into a gasket in the form of a closed loop.

* * * * *